United States Patent [19]  [11] Patent Number: 4,494,645
Hessling et al.                  [45] Date of Patent: Jan. 22, 1985

[54] TURNING DEVICE

[75] Inventors: Heinz W. Hessling, Beckum; Gottfried Weykam, Hesslerstrasse 14, 4700 Hamm 1, both of Fed. Rep. of Germany

[73] Assignee: Gottfried Weykam, Hamm, Fed. Rep. of Germany

[21] Appl. No.: 399,984

[22] Filed: Jul. 19, 1982

[30] Foreign Application Priority Data

Jul. 22, 1981 [DE] Fed. Rep. of Germany ....... 3128917

[51] Int. Cl.³ .............................................. B65G 47/24
[52] U.S. Cl. ....................................... 198/414; 104/35
[58] Field of Search ......................... 198/414; 105/177; 104/35, 131; 193/35, 55; 414/62, 31

[56] References Cited

U.S. PATENT DOCUMENTS 2,897,948 8/1959 Cranston, Jr. .................. 198/414 X
3,100,039 8/1963 Oderman et al. .................... 198/414

FOREIGN PATENT DOCUMENTS 155156 5/1982 Fed. Rep. of Germany ...... 198/414

Primary Examiner—Joseph E. Valenza
Assistant Examiner—Dennis Williamson
Attorney, Agent, or Firm—Michael J. Striker

[57] ABSTRACT

A turning device for piece-goods and bagged goods has transporting devices for transporting goods, and a supporting element located between the transporting elements and turnable about a substantially upright axis so as to support the goods and turn the latter. A transporting element is arranged under the supporting element and has a plurality of transporting members on axles, wherein the axle supporting one of the transporting members extends in the central area of the supporting element through a hollow axle of the latter. The supporting element and/or transporting element are movable between proximal and distal positions relative to one another.

12 Claims, 3 Drawing Figures

TURNING DEVICE

BACKGROUND OF THE INVENTION

The invention relates to a turning device for piece-goods or bagged goods.

It is well known that piece-goods or bags filled by filling machines are transported to loading places by conveyors. Various patterns of packing are needed for loading these goods or bags on pallets or trucks. For this purpose it is required during transportation of these goods to the loading places to turn the bag or piece through 90° to thereby form the packing patterns with crossing layers. Devices which are known for turning the piece-goods or bags are composed of conveyors or roller tracks with turning arms or turning mechanisms. The known devices do not work precisely and often damage sensitive goods. Moreover, turning of goods, for example plastic bags, is not possible because of the high friction on the conveyors.

SUMMARY OF THE INVENTION

Accordingly, it is an object of the present invention to provide a turning device for turning piece-goods and bags, which avoids the disadvantages of the prior art.

In keeping with these objects, and with others which will become apparent hereinafter, one feature of the present invention resides, briefly stated, in a turning device which has transport means for transporting goods and a supporting element located between the transport means and turnable about a substantially upright axis so as to support the goods and turn the same. The supporting element may be formed as a cross-like supporting element or a turntable.

In accordance with another feature of the present invention the supporting element formed as a cross-like element or a turntable is provided with a plurality of recesses or spaces.

Still another feature of the present invention is that the supporting element has an axle with an upper part which is hollow and has a plurality of segment-like openings.

A further feature of the present invention is that a transporting element is located under the supporting element and has a plurality of transporting members with axles, and the axle of at least one transporting member extends through the segment-like openings of the upper portion of the hollow axle of the supporting element.

Finally, still a further feature of the present invention is that the supporting element and/or the transporting element are vertically movable relative to one another between a proximal position and a distal position.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
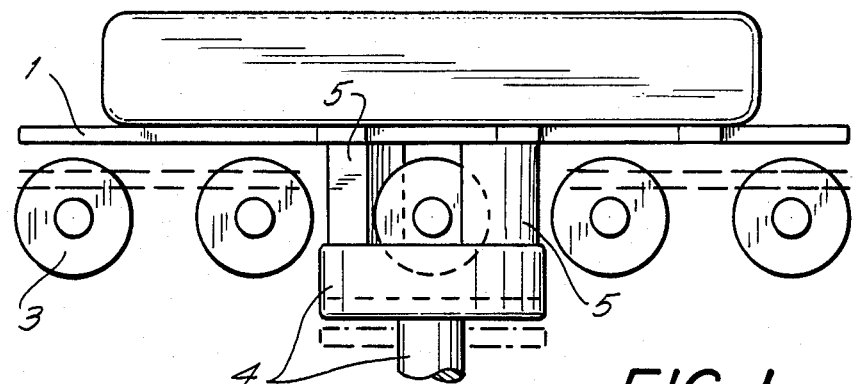
FIG. 1 is a side view of a turning device according to the invention.

A turning device for piece-goods and bagged goods has a supporting element which is identified by reference numeral 1 and located between a supply transport means and a withdrawal transport means formed as roller tracks, conveyors, or equivalent means.

Figure 2:
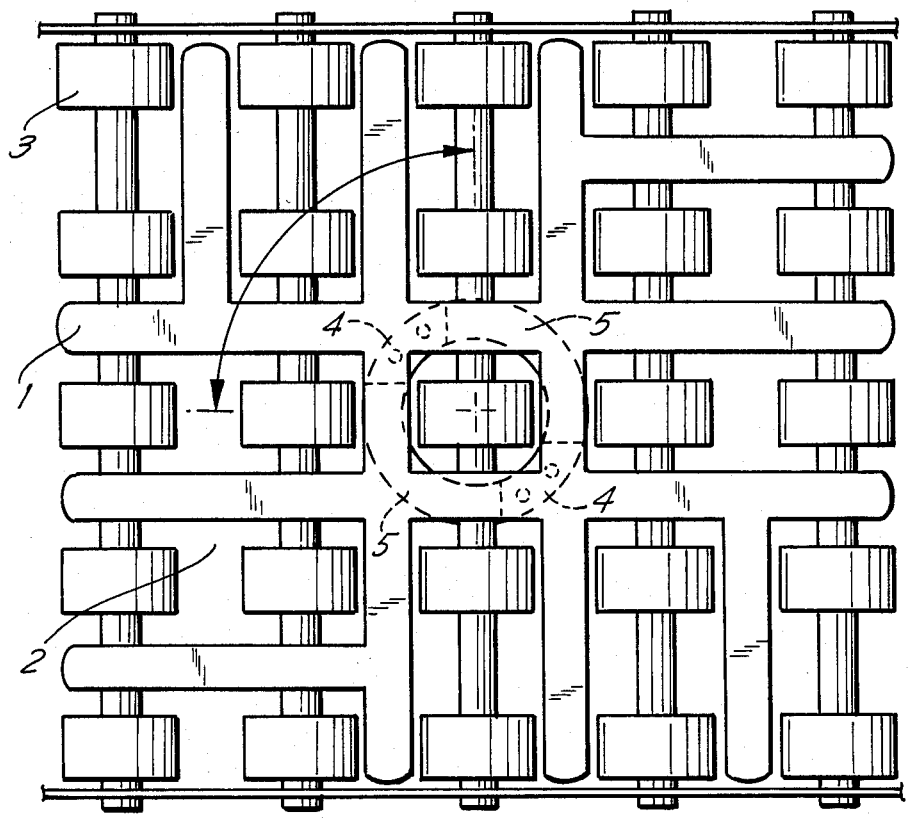
FIG. 2 is a plan view of the inventive turning device.

The supporting element is formed as a cross-like supporting element or a turntable. It has a plurality of supporting members extending in a substantially horizontal plane transverse to one another. The supporting element 1 is turnable about a substantially upright axis. It is to be understood that the supporting element 1 can have only two supporting members extending transverse to one another. As can be seen from FIG. 2, the supporting element 1 has a plurality of recesses or openings identified by reference numeral 2.

A transporting element 3 is located under the supporting element 1 and has a plurality of driven or not driven transporting members. The transporting members of the transporting element 3 are located in the recesses 2 of the supporting element 1 and formed as rollers, belts, or equivalent members.

The supporting element 1 and/or the transporting element 3 are movable relative to one another in a substantially vertical direction. More particularly, they are movable relative to one another between a proximal position in which the supporting element 1 and the transporting element 3 are located close to one another and the goods can be transported on the transporting element 3 and the supporting element 1 cannot turn, and a distal position in which the supporting element 1 and the transporting element 3 are spaced from one another so that the supporting element 1 can turn relative to the transporting element 3.

In accordance with the novel featuures of the present invention, the supporting element 1 is provided with an axle 4 which has a hollow upper part provided with a segment-like recess 5. As can be seen from FIG. 2, the transporting members of the transporting element 3 are arranged on axles. The axle of at least one transporting member extends through the segment-like recesses 5 of the upper portion of the hollow axle 4 of the supporting element 1. This allows turning of the supporting element 1 relative to transporting element 3, for example through 90°.

Figure 3:
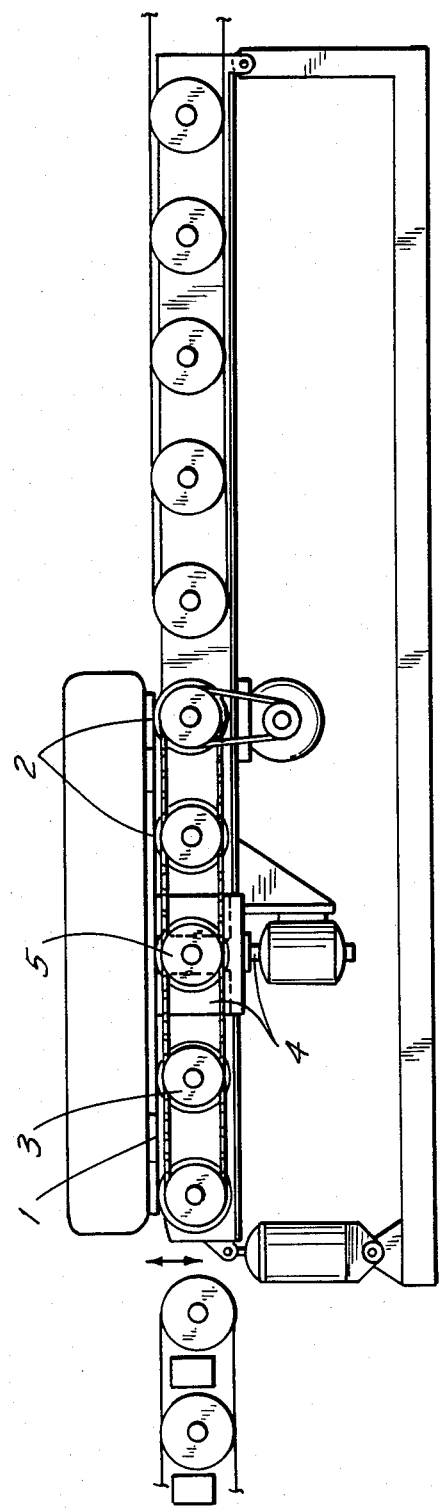
FIG. 3 is a view showing the inventive turning device located between transport means.

FIG. 3 shows the inventive turning device with further details. It shows a supply transport means and a withdrawal transport means located at both sides of the supporting element 1 and the transporting element 3. An electric motor drives the axle 4 of the supporting element 1 in rotation. Another electric motor drives one of the rollers of the transporting element 3 in rotation. A cylinder-and-piston unit is provided for lifting and lowering of a frame which supports the transporting members of the transporting element 3. It is to be understood that means can also be provided for lifting and lowering the supporting element 1.

The turning device in accordance with the present invention operates in the following manner.

Goods are supplied to the turning area by the supply transport means. When the goods have been brought into the right position in the turning area on the supporting element 1, the supporting element 1 is lifted and/or the transporting element 3 is lowered. Then, the supporting element 1 is turned through a required angle and turns the goods supported thereon. After this, the supporting element 1 is lowered and/or the transporting element 3 is lifted to assume their initial positions relative to one another. The withdrawal transport means withdraw the turned goods from the turning area.

When the turning device is designed in accordance with the present invention and the transporting members are provided in the very center of the turning area, the starting friction forces during supply and withdrawal of the goods to be turned, especially bags, are eliminated. The lowering of the transporting element in the turning area and turning of the goods in the transport plane is advantageous for providing high speeds with optimum careful treatment of the goods. This allows, for example, the utilization of two-layer paper bags.

It will be understood that each of the elements described above, or two or more together, may also find a useful application in other types of constructions differing from the types described above.

While the invention has been illustrated and described as embodied in a turning device for piece-goods and bagged goods, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A turning device for piece goods and bagged goods, comprising
   a supporting element located between supplying and withdrawing transport means and turnable about an axis so as to support the goods and turn the goods;
   a turnable axle for turning said supporting element, said axle having an upper portion which is hollow and provided with a plurality of openings;
   means for turning said axle so as to turn said supporting element;
   a transporting element vertically movable relative to said supporting element between a distal position in which said transporting element moves downwardly away of said supporting element whereby said supporting element is able to turn with goods supplied thereonto, and
   a proximal position in which said transporting element moves upwardly to said supporting element and transports the goods from said supporting element, said transporting element including a plurality of moveable transporting members;
   a plurality of axles which bear said transporting members, one of said axles of said transporting members extending through the respective openings of said hollow upper portion of said axle of said supporting element and bearing a respective one of said transporting members in the center of said supporting element; and
   means for vertically moving said transporting element relative to said supporting element.

2. A device as defined in claim 1, wherein said supporting element is formed as a cross-like supporting element having at least two supporting members extending substantially transverse to one another.

3. A device as defined in claim 2, wherein said cross-like supporting element has a plurality of such supporting members extending substantially transverse to each other.

4. A device as defined in claim 1, wherein said supporting element is formed as a turntable.

5. A device as defined in claim 1, wherein said supporting element is provided with a plurality of recesses.

6. A device as defined in claim 5 wherein, said transporting members are spaced from each other and located in said recesses of said supporting element.

7. A device as defined in claim 6, wherein said transporting members of said transporting element are formed as transporting rollers.

8. A device as defined in claim 6, wherein said transporting members of said transporting element are formed as driven transporting members.

9. A device as defined in claim 6, wherein said transporting members of said transporting element are formed as non-driven transporting members.

10. A device as defined in claim 1, wherein said transport means includes conveyors.

11. A device as defined in claim 1, wherein said transport means includes roller tracks.

12. A turning device as defined in claim 1, wherein said openings of said upper portion of said axle for turning said supporting element are segment-like.

* * * * *